United States Patent [19]

Timm et al.

[11] Patent Number: 4,965,299

[45] Date of Patent: Oct. 23, 1990

[54] INLAID AGGREGATE PLASTIC FLOOR TILE

[75] Inventors: Walter C. Timm, Cornwall; Michael H. McNally, New Windsor, both of N.Y.

[73] Assignee: Tarkett AB, Ronneby, Sweden

[21] Appl. No.: 413,208

[22] Filed: Sep. 27, 1989

[51] Int. Cl.$^5$ ........................ C08L 27/04; C08L 27/06
[52] U.S. Cl. .................................... 523/437; 524/508; 524/509; 524/513; 523/205
[58] Field of Search ................ 523/205; 524/508, 509, 524/513

[56] References Cited

U.S. PATENT DOCUMENTS 3,787,280  1/1974  Conger et al. ...................... 161/168
4,501,783  2/1985  Hiragami et al. ................... 428/147

*Primary Examiner*—Joseph L. Schofer
*Assistant Examiner*—John J. Guarriello
*Attorney, Agent, or Firm*—Nies, Kurz, Bergert & Tamburro

[57] ABSTRACT

An inlaid tile composition in which filled colored polymeric chips are uniformly dispersed throughout a filled thermoplastic tile base is disclosed. The chips remain discrete during temperture processing in an intensive mixer such as a Banbury mixer, without smearing or elongation of the chips during processing. The tile base may contain a lubricant to reduce processing temperatures in the intensive mixer.

13 Claims, 1 Drawing Sheet

INLAID AGGREGATE PLASTIC FLOOR TILE

BACKGROUND AND SUMMARY OF THE INVENTION

The present invention relates to an inlaid tile in which filled colored polymeric chips are uniformly dispersed throughout a filled thermoplastic mass which may be of a different color. The chips remain discrete during high temperature processing in an intensive mixer such as a Banbury mixer or mixing mill. By the invention, an inlaid tile is produced with decorative plastic chips which are dispersed throughout a thermoplastic base so that the chips remain discrete and non-smearing and do not elongate during processing.

Previous compositions having chips contained within a thermoplastic base material are described, for example, in the following U.S. Pat. Nos.: 3,787,280 to Conger et al.; 3,966,857 to Charlton et al; and 4,501,783 to Hiragami et al.

By the present invention, there is provided an improved inlaid floor tile in which colored chips are formulated with polymers, stabilizers, fillers, cross linking agents and pigments which differ from the thermoplastic base. The base is produced with polymers, stabilizers, fillers, processing aids, pigments and internal lubricants or fillers coated with lubricants. The lubricants are used in the thermoplastic base to reduce processing temperatures in the intensive mixer so that the decorative chips remain discrete particles and do not flow during processing.

DESCRIPTION OF THE PREFERRED EMBODIMENTS

Figure 1:
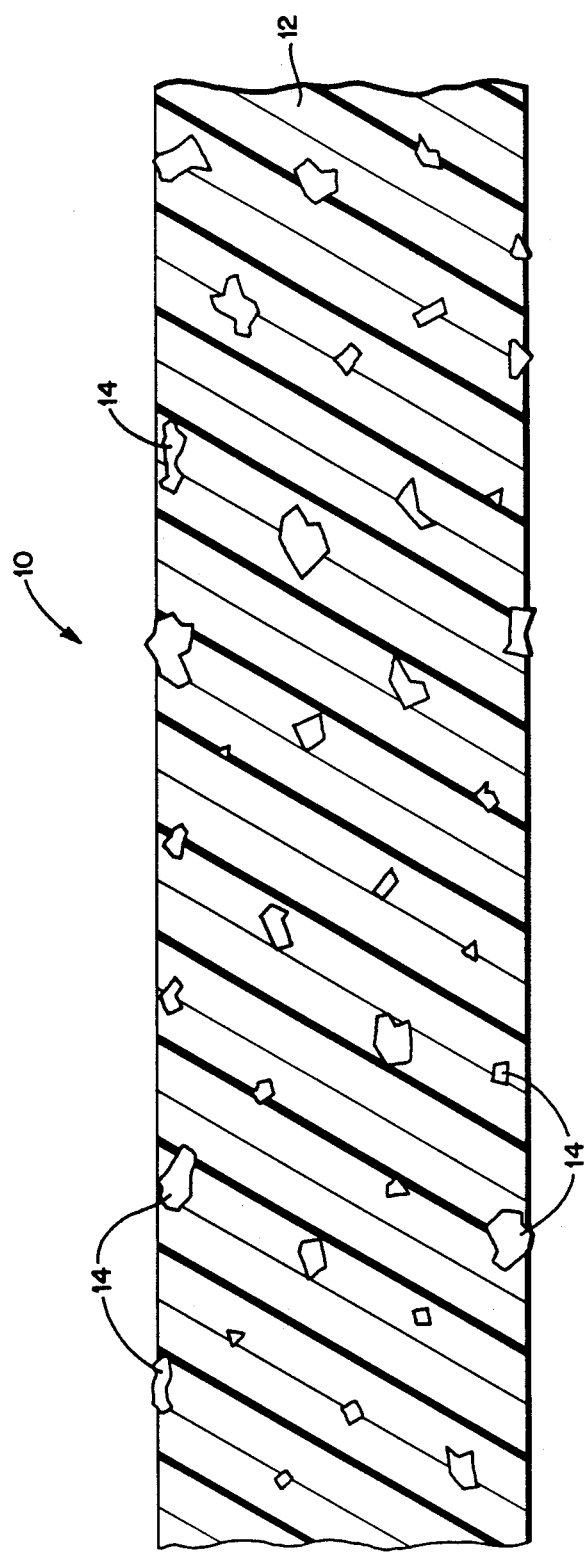
FIG. 1 is a vertical cross-sectional view of a portion of the tile composition of the present invention, containing the tile base with particulate materials dispersed therein.

In the embodiment of the invention as shown in FIG. 1, there is provided a tile composition 10 having a tile base 12 with particles or chips 14 uniformly dispersed throughout the base 12 as shown.

In accordance with the present invention, techniques which may be employed to produce the polymeric phase of the chip formulation include:
1. Cross linking
2. Combination of partially cross linking and high melting thermoplastics in which each chip is formulated with partial cross-linking and the remainder of the chip polymeric phase is high melting thermoplastic.

As an example of chip production, the chips may be produced by mixing the ingredients in an intensive mixer, such as a steam-jacketed Banbury mixer operating at 40 to 46 rpm with steam at 310° F. Mixing continues until the combination of the heat provided by the steam and the shear action of the mixer produces a temperature in the material being mixed of about 350° F., and under such conditions the ingredients become a molten mass. The mass is then calendared to produce a sheet approximately 100 mils thick. The sheet is heated to 400° F. by use of radiant heat or other means to partially cross link the polymeric ingredients, after which the sheet is cooled and ground into small chips. In an alternative embodiment the calendared sheet may first be ground into chips and then fed into a fluidized bed to effect cross linking of the polymeric components.

The size of the chips employed in the invention include particles in which the major portion, about 94 to 100 wt. percent, has a U.S. mesh size of between 10 and 200 mesh, and including an additional portion of 0 to 1 wt. percent of a size which is retained on a 10 U.S. mesh screen and a portion of 0 to 5 wt. percent which passes through a 200 U.S. mesh screen. In a preferred embodiment the chips have a Shore D hardness range of 75 to 88. As shown in FIG. 1, the chips produced by the present invention preferably are not round but angular and non-uniform in shape, having sharp edges and with the chip size of the major portion being uniformly distributed throughout the mesh size of 10 to 200 mesh.

An example of a chip formula is as follows:

| Chip Formula | % by wt |
|---|---|
| 1. Polyvinyl Chloride Homopolymer | 35.0 |
| 2. Phenolic Resin | 7.0 |
| 3. Pentaerythritol | 1.0 |
| 4. Magnesium oxide | 1.0 |
| 5. −40 Mesh Limestone (420 Microns) | 55.9 |
| 6. Red Pigment (oxide) | 0.1 |
| Total | 100.0 |

With regard to the chip formula, ingredient No. 1 is the main thermoplastic synthetic polymer component of the chips and is present in an amount of about 25 to 80 weight percent of the chip composition, depending on the filler level of the chips. In addition to the above stated example, the thermoplastic polymer component may alternatively be one or more of the following: (a) a copolymer of polyvinyl chloride with polyvinyl acetate; (b) polyester resin; or (c) chlorinated polyethylene, and need not necessarily have a softening temperature higher than the polymers used in the tile base since it will be partially cross-linked during chip manufacture.

Ingredient No. 2 functions as a plasticizer which will liquify initially for the initial phase in the Banbury mixer but is then irreversibly cross linked with ingredients 3 and 4 at 400° F. and will not liquefy again. The plasticizer may also be polyester or epoxy resin or a combination of said resins. The plasticizer may be present in an amount of about 0 to 10 weight percent of the chip composition. In a preferred embodiment, the amount of plasticizer is about 5 to 9 weight percent of the chip composition.

During chip production, the polyvinyl chloride or other thermoplastic polymer component cross links or partially cross links with magnesium oxide and pentaerythritol. The phenolic resin also cross links with magnesium oxide and pentaerythritol.

Any of various colored pigments may be employed in the chip composition. A high melting thermoplastic in the form of an acrylic resin such as polymethyl methacrylate polymer may be employed in combination with the phenolic resin to enhance the flowability. Such a high melting thermoplastic will soften or flow during chip production but will not soften or flow during the second phase of tile production in which the chips are mixed with the tile base material. In another embodiment, an epoxy resin is employed instead of the phenolic resin and melamine is added to cross link the epoxy.

In the production of the chips by a combination of partially cross linking and high melting thermoplastics, approximately 9 to 30 weight percent of the total chip formulation is cross linked. Thus approximately 18 to 70 weight percent of the chip polymeric phase is cross linked. The amount of cross linking is controlled by the temperature and time employed during chip production as well as by the amount of cross linking agent employed.

The high melting thermoplastics include those materials which do not soften or flow at the temperatures employed during mixing of the chips with the tile base material in the intensive mixer. The high melting thermoplastic materials may include, for example, a combination of acrylic resin and PVC. The high melting thermoplastic component can be present in an amount of about 5 to 50 weight percent of the total chip composition.

In the event that cross linked chips are employed without high melting thermoplastics, it is not necessary to employ lubricant in the base material, provided the chip material is irreversibly cross linked.

By the use of partial cross linking in chip production along with high-melting thermoplastics, processing time required to cross link can be reduced from one-half hour or more down to a time of about 15 seconds. Such a feature is highly advantageous in reducing the amount of line time so that the process can be carried out in an efficient and economical manner.

The -40 mesh limestone functions as a filler in the chip formula. Other suitable filler materials may be employed. The chip composition contains about 10 to 75 weight percent filler.

The amount of chips employed in the tile base is generally about 2 to 10 weight percent of the total formulation of chips and base.

As an example of production of the tile composition of the present invention, the tile base may first be produced by adding the ingredients to an intensive mixer such as a steam-jacketed Banbury mixer having steam at 310° F. and operating at 40 to 46 rpm, with mixing for a period of about 2 minutes until the ingredients become a molten thermoplastic mass, at which time the cross linked chips previously produced are added. After a mixing period of about 20 seconds to 1 minute, the molten mass at a temperature of about 300° F. is dropped to a two roll heated mill where a sheet is formed. The sheet is calendared to thickness, then cooled and cut into tiles of the desired size such as 12"×12". The thickness of the final tile product is generally about 0.0625 to 0.231 inch.

An example of a tile base formula is as follows:

| Tile Base Formula | % by wt |
|---|---|
| 1. Resin mixture 40% PVC homopolymer and 60% PVC, PVA Copolymer | 13.0 |
| 2. Ground Limestone —40 Mesh and finer | 59.8 |
| 3. Plasticizer DINP | 4.0 |
| 4. Zinc Stearate (Lub) | .02 |
| 5. Stabilizer Synpron 1751 Calcium Zinc Type | .88 |
| 6. Hi-Plex 100 Pfizer Surface treated CaCO3 with Calcium Stearate | 10.0 |
| 7. Processing aid alpha methyl styrene | 1.5 |
| 8. Talc 7 Micron | 10.0 |
| 9. Pigment (TiO2) | 0.8 |
| Total | 100.00 |

With regard to the tile base formula, ingredient No. 1 is the main thermoplastic synthetic polymer component of the tile base and is present in an amount of about 10 to 25 weight percent of the tile base. The thermoplastic base component may be produced from any suitable filled polymer, such as that formed of a vinyl polymer, including a homopolymer, a copolymer or a combination of the two. Thus the thermoplastic polymer component may, for example, be a combination of from about 40 to 100 weight percent, preferably about 40 to 80 weight percent, of PVC homopolymer and from about 0 to 60 weight percent, preferably from about 20 to 60 weight percent, of a copolymer of PVA and PVC. The thermoplastic polymer component may also be formed of polypropylene or polybutylene materials.

Ingredient No. 2 functions as a filler in the tile base. Other suitable filler materials may be employed. The amount of filler in the tile base can be about 50 to 85weight percent.

Ingredient No. 3 functions as a plasticizer and may be present in an amount of about 3 to 6 weight percent of the tile base.

With regard to the lubricant component, it is possible to obtain the desired lubricating property by the use of any one of ingredients Nos. 4, 5 or 6. In this regard, ingredient No. 6 may be employed in amounts of up to 20 percent and this surface treated limestone includes a small amount of lubricant which acts to control the drop temperature. By the use of a lubricant component in the tile base, the drop temperature may be maintained at 300° F. or less so that the chips when added will not soften or melt. In this regard, the amount of lubricant employed is generally in an amount of about 0.10 to 1.0 percent by weight of the tile base. Satisfactory lubricants include calcium stearate, zinc stearate, and stearic acid, as well as various oleates and palmitates known in the art.

With regard to that portion of the process in which the molten mass is dropped to the two roll mill, a short time interval such as about 20 seconds after addition of the chips is desirable before the material is dropped, in order to maintain definition of the chips. At least about 20 seconds in the high intensity mixer is needed to obtain proper chip dispersal in the base material. Thus a time interval of about 20 seconds to 1 minute is usually employed. The chips may be subject to bleeding or breaking if mixed for longer periods of time. Also shear forces develop upon addition of the chips which could cause the temperature to rise above 300° F., thus softening the chips.

The use of reaction temperatures in the range of about 300° to 400° F. is particularly desirable when PVC is employed, in order to maintain the stability of the PVC component. At temperatures above 400° F., the PVC degrades and there is not sufficient time for proper utilization of the PVC. At temperatures below about 280° F., on the other hand, PVC will not process or fuse properly.

In one embodiment of the invention, the chips and the tile base had a formulation hardness as follows, based upon a 77° F. indentation test in accordance with Federal Test Method Standard No. 501:
Chips - 4 to 6 mils at Gauge 90 to 100 mils
Base - 9 to 11 mils at Gauge 125 mils Important concepts which are employed in the present invention include:

1. Use of cross linked materials which are irreversibly cross linked so as to produce the desired chips which remain discrete non-smearing and do not elongate during processing. The cross linked product is insoluble in tetrahydrofuran (THF) indicating irreversible cross linking and the formulation can be also partially cross linked as indicated by partial solubility in THF so as not to flow at intensive mixer temperature at which the chips are added to the thermoplastic base.

2. Use of either one or a combination of (a) partial cross linking and (b) high melting temperature thermoplastics to produce chips which do not flow at the temperatures required in the intensive mixer. The partially cross linked materials are those which will not flow at temperatures of up to 350° F. when PVC is employed.

3. Use of lubricants in the thermoplastic base to reduce the processing temperatures in the intensive mixer such as a Banbury so that the partially cross linked and high melting temperature polymers decorative chips remain discrete particles and do not flow during processing. In this way, the mixing temperature is controlled so it is below the softening point of the chips. The drop temperature, when the molten batch is dropped onto the mill, is generally around 300° F. when PVC is employed.

4. Use of chips and thermoplastic base materials which are highly filled to provide a tile product which is dimensionally stable and can be easily cut on the punch presses employed to cut the tile. The chips will generally contain about 10 to 75 weight percent filler and the base material will contain about 50 to 85 weight percent filler.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A tile composition formed with resinous chips which are partially cross-linked to allow such chips to remain discrete during processing, comprising a tile base containing (a) about 10 to 25 weight percent of thermoplastic polymer in the form of polyvinyl chloride homopolymer or a vinyl chloride copolymer in which the vinyl chloride portion is predominant, (b) about 50 to 85 weight percent of filler material and (c) a lubricant component, said tile base having uniformly dispersed therein about 2 to 10 weight percent of the composition of particulate materials in the form of thermoplastic chips containing (a) about 25 to 80 weight percent of thermoplastic polymer in the form of polyvinyl chloride homopolymer or a vinyl chloride copolymer in which the vinyl chloride portion is predominant, (b) about 10 to 75 weight percent of filler material and (c) a plasticizer selected from the group consisting of phenolic resin, polyester or epoxy resin, each of said chips being cross-linked in an amount of from about 18 weight percent of the polymeric phase to an amount not greater than an amount which prevents flowing at elevated temperatures.

2. The tile composition of claim 1 wherein said tile base includes a lubricant in the form of an internal lubricant or a filler coated with lubricant.

3. The tile composition of claim 1 wherein said lubricant is present in an amount of about 0.10 to 1.0 weight percent of the tile base.

4. The tile composition of claim 1 wherein said tile base is formed of polyvinyl chloride or a copolymer of polyvinyl chloride and polyvinyl acetate.

5. The tile composition of claim 1 wherein said chips are partially soluble in tetrahydrofuran.

6. The tile composition of claim 1 wherein said chips include about 5 to 50 weight percent of a high-melting thermoplastic material.

7. The tile composition of claim 6 wherein said high melting material is an acrylic resin.

8. The tile composition of claim 1 wherein said chips contain about 25 to 80 weight percent of a thermoplastic polymer, about 10 to 75 weight percent of filler material and about 5 to 9 weight percent of a cross-linking plasticizer.

9. The tile composition of claim 1 wherein said chips are cross-linked in an amount of about 9 to 30 weight percent of the total chip formulation.

10. The tile composition of claim 1 wherein about 94 to 100 weight percent of the chips are of a U.S. mesh size in the range of from about 10 to 200 mesh.

11. The tile composition of claim 1 wherein the chips have a Shore D hardness range of 75 to 88.

12. The tile composition of claim 1 wherein the thermoplastic polymer of the tile base is a combination of from about 40 to 80 weight percent PVC homopolymer and from about 20 to 60 weight percent of a copolymer of PVA and PVC.

13. The tile composition of claim 1 wherein the chips are angular and non-uniform in shape, some having sharp edges and with a major portion of a size uniformly distributed throughout a U.S. mesh size range of 10 to 200.

* * * * *